United States Patent
Hollström et al.

(10) Patent No.: US 7,239,891 B2
(45) Date of Patent: *Jul. 3, 2007

(54) PORTABLE TELECOMMUNICATION APPARATUS FOR CONTROLLING AN ELECTRONIC UTILITY DEVICE

(75) Inventors: Magnus Hollström, Lund (SE); Robert Hed, Lund (SE); Patrik Olsson, Malmö (SE); Anders E Edlund, Höllviken (SE); Björn Ekelund, Bjarred (SE); Nils Rydbeck, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

This patent is subject to a terminal disclaimer.

(21) Appl. No.: 10/857,854

(22) Filed: Jun. 2, 2004

(65) Prior Publication Data

US 2005/0009561 A1 Jan. 13, 2005

Related U.S. Application Data

(63) Continuation of application No. 09/714,884, filed on Nov. 17, 2000, now Pat. No. 6,763,247.

(60) Provisional application No. 60/171,109, filed on Dec. 16, 1999.

(30) Foreign Application Priority Data

Dec. 1, 1999 (SE) .................................. 9904398

(51) Int. Cl.
*H04M 1/00* (2006.01)

(52) U.S. Cl. .................. 455/556.1; 455/41.2; 455/352; 455/418

(58) Field of Classification Search ............. 455/556.1, 455/41.2, 352, 418, 566, 575.2, 556, 575.5, 455/420, 419
See application file for complete search history.

(56) References Cited

U.S. PATENT DOCUMENTS 5,138,649 A 8/1992 Krisbergh et al.

(Continued)

FOREIGN PATENT DOCUMENTS

EP 0 913 979 A2 5/1999

(Continued)

OTHER PUBLICATIONS

*Wireless Application Protocol Forum, Ltd.*, 1998, WAP *Architecture*, Version 30- Apr. 1998, "Wireless Application Protocol Architecture Specification".

(Continued)

*Primary Examiner*—Matthew D. Anderson
*Assistant Examiner*—Tan Trinh
(74) *Attorney, Agent, or Firm*—Michael Cameron, Esq.

(57) ABSTRACT

A portable telecommunication apparatus has a user interface, a programmable controller, a memory coupled to the controller, and an information access program, such as a WAP browser, which is stored in the memory and is executable by the controller. The information access program provides access for a user to a global information network, such as Internet, through the user interface and a first wireless communication link. The apparatus also has an external device interface for connecting an external device to the portable telecommunication apparatus over a second communication link. The information access program allows the user to control the external device through the user interface, the external device interface and the second communication link.

9 Claims, 3 Drawing Sheets

U.S. PATENT DOCUMENTS

| | | | |
|---|---|---|---|
| 5,806,005 A | 9/1998 | Hull et al. | |
| 5,913,171 A * | 6/1999 | Solonen et al. | 455/502 |
| 6,192,257 B1 | 2/2001 | Ray | |
| 6,223,029 B1 * | 4/2001 | Stenman et al. | 455/420 |
| 6,317,609 B1 * | 11/2001 | Alperovich et al. | 455/556.1 |
| 6,366,572 B1 * | 4/2002 | Esterberg et al. | 370/343 |
| 6,549,773 B1 * | 4/2003 | Linden et al. | 455/426.1 |
| 6,690,273 B2 | 2/2004 | Thomason | |
| 6,763,247 B1 * | 7/2004 | Hollstrom et al. | 455/556.1 |
| 7,006,146 B1 * | 2/2006 | Tanaka et al. | 348/376 |
| 2002/0068609 A1 * | 6/2002 | Oh et al. | 455/560 |

FOREIGN PATENT DOCUMENTS

| | | | |
|---|---|---|---|
| SE | WO 9849818 | * | 11/1998 |
| WO | 98/49818 A1 | | 11/1998 |
| WO | 98/59283 | | 12/1998 |
| WO | 99/27742 | | 6/1999 |
| WO | 99/52032 A1 | | 11/1999 |

OTHER PUBLICATIONS

Official Action from Chinese Patent Office.
International Search Report.

* cited by examiner

PORTABLE TELECOMMUNICATION APPARATUS FOR CONTROLLING AN ELECTRONIC UTILITY DEVICE

This application is a continuation under 35 U.S.C. §120 of U.S. patent application Ser. No. 09/714,884, filed Nov. 17, 2000, now U.S. Pat. No. 6,763,247 which claims priority under 35 U.S.C. §119 of U.S. Provisional Application Ser. No. 60/171,109, filed on Dec. 16, 1999, and Swedish Application SE 9904398-6, filed Dec. 1, 1999, the entire contents of which are hereby incorporated by reference.

TECHNICAL FIELD

The present invention relates to portable telecommunication apparatuses of the type comprising an information access program, such as a WAP browser, for allowing a user to access a global information network, such as Internet, through a wireless communication link. The invention also relates to electronic utility devices of the type which provides a functionality to a user and which has an external control interface, such as an infrared interface, for remotely controlling the functionality of the device.

More specifically, the invention is directed at the use of a portable telecommunication apparatus with an information access program according to the above for accessing, controlling and operating an electronic utility device through the information access program.

A portable telecommunication apparatus as set out above may for instance be a mobile or cellular radio telephone for GSM (Global System for Mobile Communication) or any other existing mobile telecommunications system. Moreover, an electronic utility device according to the above may be an advanced accessory for the mobile telephone, for instance a satellite navigation module (GPS), an FM radio or a digital video camera.

An electronic utility device according to the above may also be e.g. a video recorder, a digital camera, a television set, a hifi stereo, or an air conditioner.

The various examples of electronic utility devices given above all have in common that they may normally be operated by a remote control unit, such as an infrared remote control unit, in addition to a local user interface provided at a control panel of the device itself, such as a set of control buttons and LED indicators. Typically, a separate remote control unit is used for each individual electronic utility device.

Although some infrared remote control units are programmable and may therefore be adapted for use with several electronic utility devices, the existing approach has several drawbacks. First of all, remote control units have a tendency of disappearing in many homes, especially in families where small children are present. Furthermore, the various remote control units will have to be kept within reach of the intended user and will therefore occupy unnecessary storage space on desktops, table surfaces, etc. Moreover, the user interface of a typical remote control unit has a low level of user friendliness; the user interface is restricted to various small keys or buttons, at best in conjunction with a miniature LCD display. Finally, each type of remote control unit has its own philosophy behind the layout of the keys, etc, thereby making it hard for users to get familiar with all different types of remote control units.

Other electronic utility devices, such as printers, telefax machines, copying machines, or home appliances such as refrigerators or microwave ovens, are usually not operated from an infrared control unit. Instead, the user of these devices is restricted to a normally very limited local user interface, such as a few control buttons and LED indicators, provided at a control panel of the device.

SUMMARY OF THE INVENTION

It is an object of the present invention to provide an easier way of accessing, controlling and operating electronic utility devices in a standardized and user-friendly fashion. A second object of the invention is to drastically reduce the number of required remote control units, specifically so that only one control apparatus is required for a large number of electronic utility devices, which may exist in the environment around a user. A third object is to provide an opportunity of remote control of electronic utility devices that traditionally are not provided with such an option. A fourth object is to provide an option for various types of electronic utility devices to connect to a global information network, such as the Internet, by using a single type of communication device, namely a portable telecommunication apparatus.

The above objects have been achieved by the inventive understanding that a portable telecommunication apparatus, preferably a cellular or mobile-radio telephone, may be used for controlling various electronic utility devices.

According to a preferred embodiment of the invention, a mobile WAP (Wireless Application Protocol) telephone having a built-in WAP browser is designed to connect via a point-to-point communication link to an electronic utility device through an accessories interface, such as a short-range radio link, an infrared link or a serial cable link, wherein the external utility device is provided with an embedded WAP server and wherein this WAP server is capable of submitting digital information related to the functionality of the external utility device over the point-to-point communication link to the WAP browser of the mobile telephone. The embedded WAP server of the preferred embodiment contains WML (Wireless Markup Language) pages, which are transmitted to the WAP client of the mobile telephone and are presented to the user. The user may control the functionality of the external utility device through the user interface of the mobile telephone and the WAP client.

A solution to the above objects is defined by the appended independent patent claims. Other features, advantages and objects of the invention will appear from the following detailed disclosure of a preferred embodiment, from the appended drawings as well as from the subclaims.

BRIEF DESCRIPTION OF THE DRAWINGS

The present invention will now be described in more detail with reference to the appended drawings, in which.

DETAILED DISCLOSURE

Figure 1:
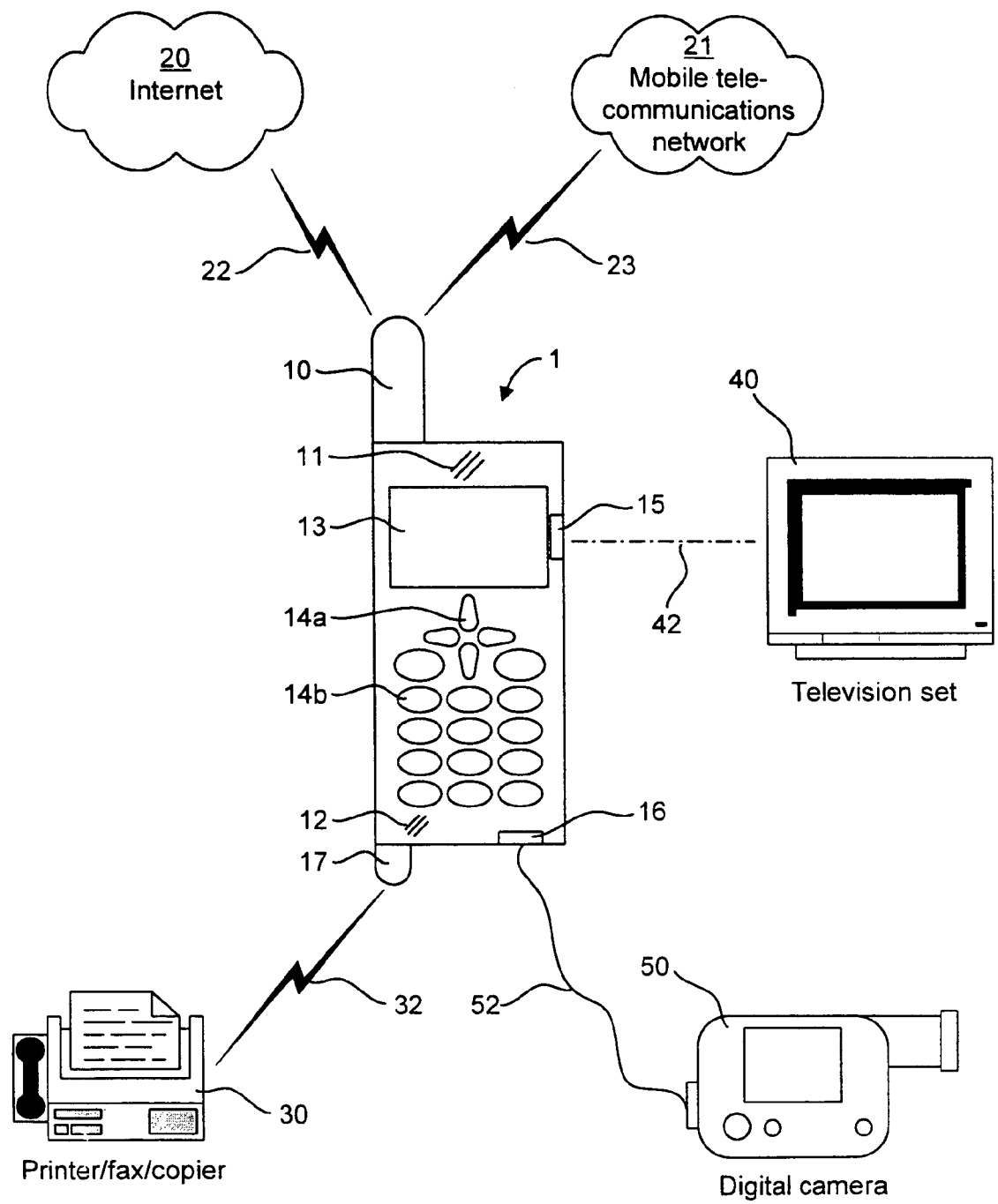
FIG. 1 is a schematic illustration of a mobile WAP telephone, which may be used for accessing the Internet, for performing traditional mobile telecommunications service calls (voice, data and fax), and for accessing, controlling and operating a plurality of electronic utility devices.

FIG. 1 is intended to illustrate the general inventive concept according to the present invention, i.e. that a user of a mobile telephone 1 or another type of portable telecommunication apparatus will be able to access, control and operate a plurality of telephone accessories, home appliances or other external electronic utility devices 30, 40, 50 through a WAP browser built into the mobile telephone. To this end, each external utility device 30, 40, 50 comprises a respective embedded WAP server, from which the WAP browser of the mobile telephone 1 will receive encoded WML pages. The pages transmitted from the embedded WAP server to the mobile telephone 1 represent the services, functionalities and applications, which are offered by the respective external utility device 30, 40, 50. As will be described in more detail below, the information contents of the WML pages may change dynamically, and moreover the user may feed back information to the respective external device 30, 40, 50 by e.g. filling in WML forms and pushing the information back to the WAP server of the external device 30, 40, 50. In this way, the user of the mobile telephone 1 may operate the respective external device 30, 40, 50 and control the functionality thereof.

As shown in FIG. 1, the mobile telephone 1 comprises an antenna 10, which in a conventional way is used for connecting the mobile telephone 1 to a mobile telecommunications network 21 through a radio link 23. In a well-known way, the mobile telecommunications network 21, for instance GSM, offers voice, data and fax call services to the user of the mobile telephone 1. By means of the antenna 10, the user of a mobile telephone 1 may also access the Internet 20, or another global information network, by using the built-in WAP browser of the mobile telephone 1. To this end, graphic information and/or text is presented on a display 13, and a set of cursor navigation keys 14a are provided in a keypad together with a set of ordinary mobile telephone keys 14b. The latter comprise e.g. a YES/OK/ANSWER key, a NO/CANCEL/HANG UP key, numeric keys 0-9 as well as other character keys, such as * and #.

As is well known, the mobile telephone 1 also comprises a loudspeaker 11 and a microphone 12. Moreover, the mobile telephone 1 of the preferred embodiment shown in FIG. 1 comprises an infrared interface 15, such as an IrDA port, by means of which the mobile telephone 1 may be connected to a first external utility device in the form of a television set 40 in FIG. 1.

The mobile telephone 1 also comprises a system or accessories connector 16, by means of which the mobile telephone 1 may be connected, through a serial cable 52 (e.g. RS232) or through direct galvanic contact, to a second external utility device in the form of a digital camera 50 of FIG. 1.

The mobile telephone 1 additionally comprises a second antenna 17 for establishing a short-range radio link 32, such as a Bluetooth link, to a third external utility device in the form of a combined printer/fax/copier in FIG. 1.

Figure 2:
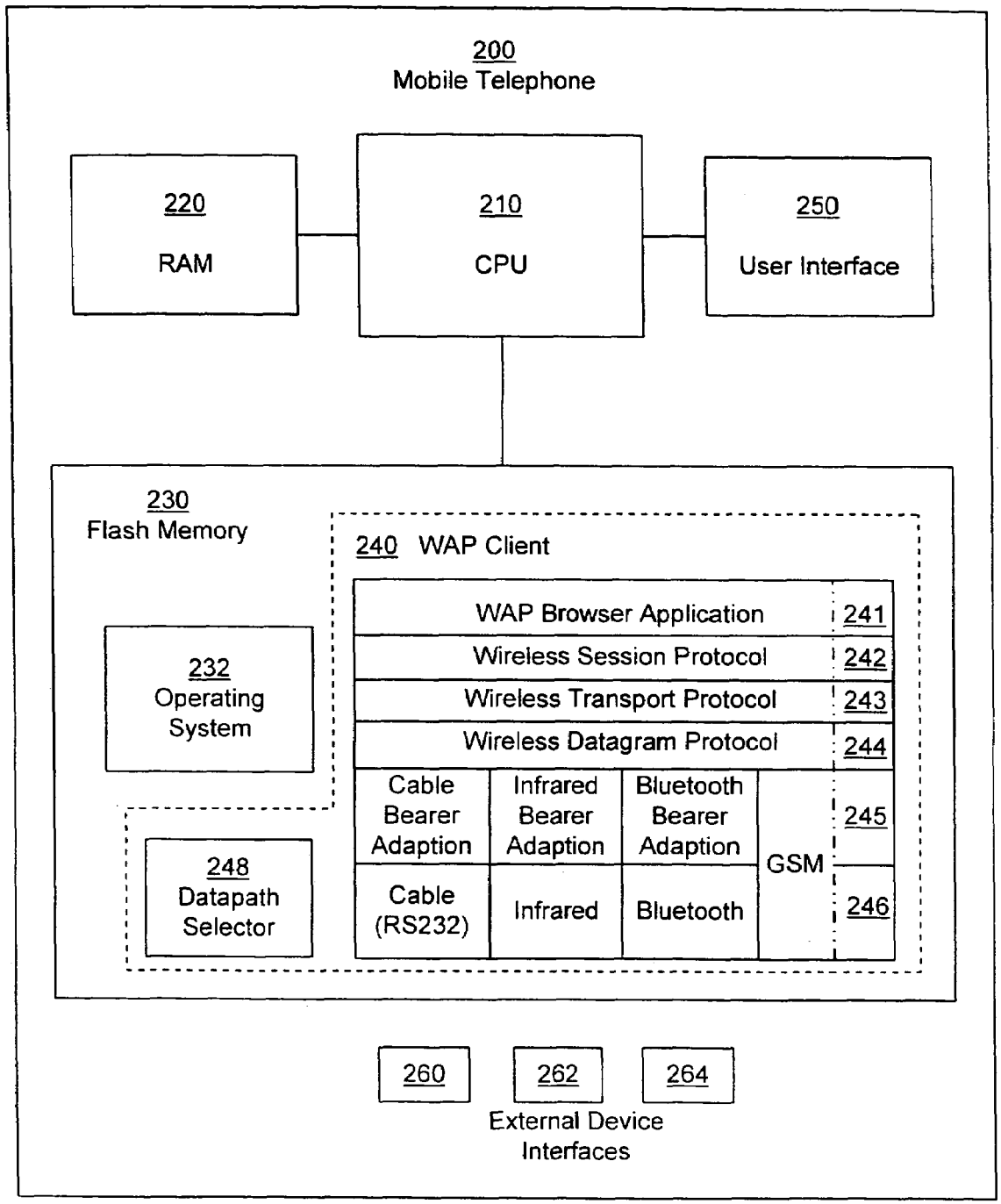
FIG. 2 is a schematic block diagram of a mobile telephone according to a preferred embodiment of the invention.

An essential portion 200 of the mobile telephone 1 is shown in FIG. 2. A controller or CPU 210 is coupled to a random access memory 220 and to drivers 250 for the user interface formed by the display 13 and the keypad 14a-b. The controller 210 is also connected to a permanent memory 230 in the form of a flash memory. The flash memory 230 comprises an operating system 232 as well as an information access program in the form of a WAP client 240, which will be described in more detail below. The mobile telephone also comprises drivers 260, 262 and 264 for the external device interfaces 15, 16 and 17 in FIG. 1. In more detail, driver 260 is an RS232 module for the system or accessories connector 16, driver 262 is an IrDA module, and driver 264 is a Bluetooth module.

As shown in FIG. 2, the WAP client 240 comprises a stack of protocols 241-246 as well as a datapath selector 248, the purpose of which will be described later. On a first level or top level 241 a WAP browser application is provided, which when executed by the controller 210 will form a graphical user interface on the display 13 and allow the user to access the embedded WAP servers of the available external utility devices 30, 40, 50. A second level 242 is a wireless session protocol. As a third and fourth level, respectively, a wireless transport protocol and a wireless datagram protocol are provided, respectively. The protocols 241-244 are all essentially known per se and are not described in more detail herein.

On a fifth level 245 a respective adaption layer is provided for the serial cable interface 16, 260, the infrared interface 15, 262 and the Bluetooth interface 17, 264. The physical layer of the respective interface is provided as a sixth protocol level 246. The adaption layer 245 thus adapts the overlying wireless datagram protocol 244 to three different bearers, i.e. cable, infrared and Bluetooth.

Moreover, a GSM layer 245, 246 is also provided, as is generally known in the field of mobile WAP telephones, for providing the first communication link 22 between the antenna 10 and the Internet 20.

The purpose of the datapath selector 248 is to direct WML requests from the WAP browser 241 to either the first communication link 22 (through a circuit-switched GSM data call connection or through SMS-Short Messages Services), or to the respective external device interface 16, 52, 260 (cable), 15, 42, 262 (infrared) and 17, 32, 164 (Bluetooth). In the preferred embodiment, this differentiation is achieved through a new address scheme for the Uniform Resource Identifier (URI)/Uniform Resource Locator (URL). For instance, when access is to be made across the first communication link 22 to ordinary web sites on the Internet 20, the ordinary URI/URL format "http:// . . . " may be used. Conversely, when any of the external utility devices 30, 40, 50 is to be accessed, the URI/URL may look like: "local:// . . . ".

Figure 3:
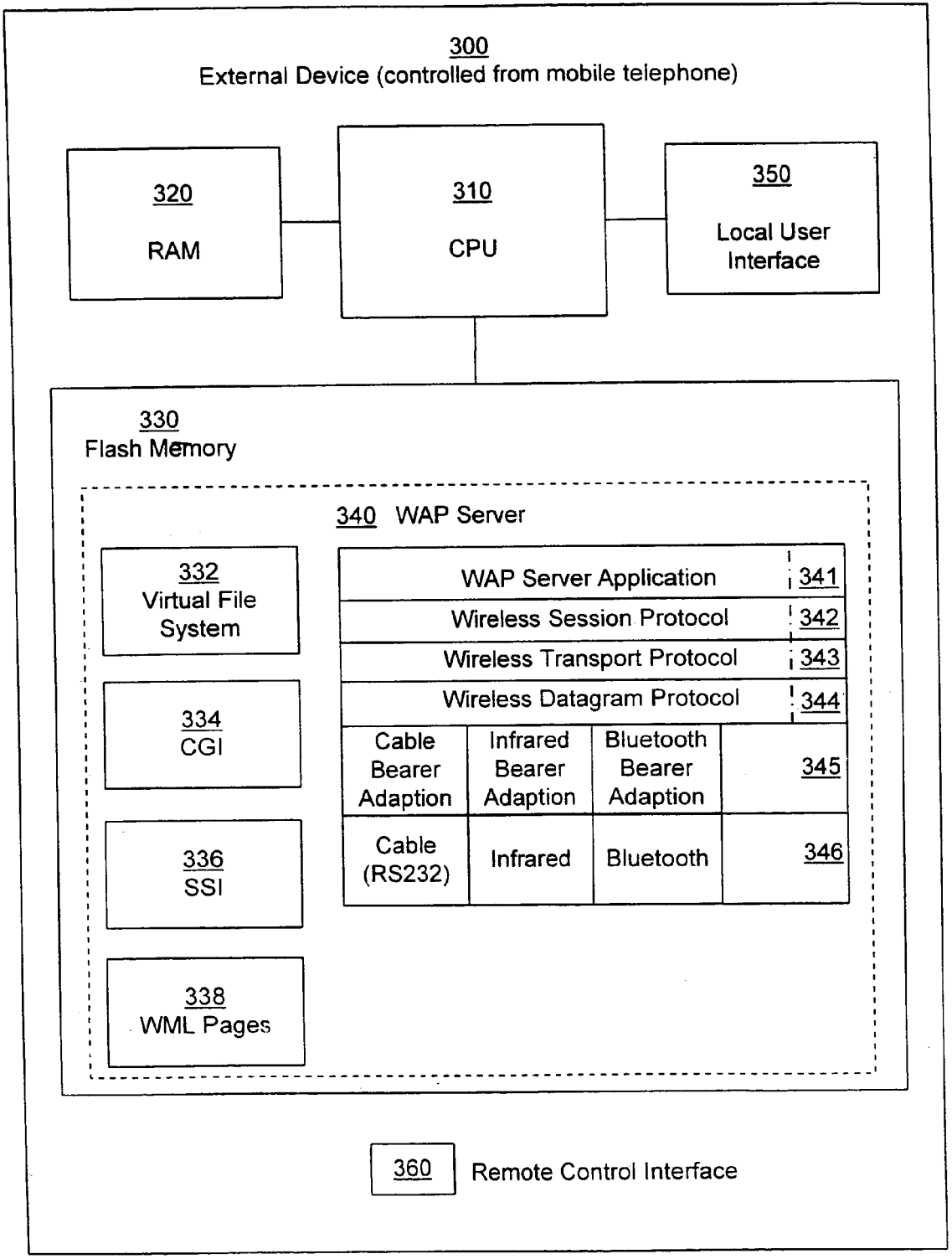
FIG. 3 is a schematic block diagram of an external utility device according to the preferred embodiment.

FIG. 3 is a schematic illustration of an essential portion 300 of any of the external utility devices shown in FIG. 1, i.e. the printer/fax/copier 30, the television set 40 or the digital camera 50. A controller or CPU 310 is connected to a random access memory 320 and a driver 350 for a local user interface. The local user interface may for instance be buttons for capturing, deleting or scrolling through pictures and a miniature LCD display on the digital video camera 50, program selection buttons, volume controls, brightness controls, etc, on the television set 40, or a telephone number keypad, a start button and a stop button on the printer/fax/copier 30.

The controller 310 is coupled to a non-volatile memory 330, which is a flash memory in the preferred embodiment. The flash memory 330 comprises an embedded WAP server 340, which will be described in more detail below. Finally, the external utility device 300 comprises a remote control interface driver 360, which is coupled to the physical cable connector of the digital camera 50, to the infrared port of the television set 40 or to the Bluetooth module of the printer/fax/copier 30 of FIG. 1.

The WAP server 340 comprises a virtual file system 332, which has the purpose of storing a plurality of WML pages 338 and, optionally, a plurality of WML scripts in a structured and readable way. The WAP server 340 also comprises a Server Side Include module 336, which enables a program developer to insert directives inside the WML code to instruct the WAP server 340 to replace the directive with a dynamic content upon retrieval of the WML code.

The WAP server 340 also comprises a Common Gateway Interface (CGI) module 334 for enabling user input from the WAP client of the mobile telephone 1 to the WAP server 340 of the external device 300. The Common Gateway Interface module 334 also comprises a set of CGI routines that, when executed by the controller 310, controls a respective aspect or parameter of the functionality provided by the external utility device 300. For instance, if the external utility device 300 is a digital camera 50, different CGI routines are provided for controlling e.g. the picture resolution, for scrolling through pictures stored in the camera, for capturing a new picture, for setting date/time, etc.

Moreover, the WAP server 340 comprises a stack of protocols 341-346, which correspond to the stack of protocols 241-246 in the mobile telephone 200 shown in FIG. 2. At a top level a WAP server application protocol 341 is provided. Then follows a wireless session protocol 342, a wireless transport protocol 343, a wireless datagram protocol 344, an adaption layer for different physical interfaces (cable, infrared or Bluetooth) and, finally, a physical interface layer 346. Preferably, the protocol stack of the WAP server 340 is adapted to all possible bearers, even if only one physical bearer 360 is used (such as either cable, infrared or Bluetooth). This makes it easier to design a generic embedded WAP server 340, which may be used in different external utility devices.

The WML contents of the WAP server 340, i.e. the WML pages 338, and, optionally, the WML scripts, are preferably stored as pre-compiled binary WML files. Alternatively, the contents may be stored as non-binary WML files, which are encoded into binary WML files by the WAP server 340 upon request from the WAP client 240 of the mobile telephone 1.

The rest of this specification will deal with the use of the mobile telephone 1/200 of FIG. 2 for controlling the external utility device 300 of FIG. 3. Obviously, the user must be able to easily access at least his/her favorite external utility devices 30, 40, 50 from the mobile telephone 1. Preferably, a dynamic menu system is implemented in the mobile telephone 1, which allows the addition of a short cut menu option for connecting to a respective external utility device 30, 40, 50. Preferably, the external utility devices 30, 40, 50 are designed to transmit an initial sequence of identifying commands to the WAP client 240 of the mobile telephone 1/200, when the mobile telephone and the external utility device are interconnected.

Thus, useful information such as physical bearer type (cable, infrared or Bluetooth), possibly an address identifier (particularly in the case of Bluetooth) as well as the name of a WML start page are submitted by the WAP server 340 to the WAP client 240 upon interconnection of the mobile telephone 1/200 and the external utility device 30, 40, 50/300. These parameters are stored together with the respective shortcut in the dynamic menu system of the mobile telephone 1/200. Alternatively, some of the parameters above, particularly the name of the start page, may be standardized, e.g. "index.wml". Still another alternative, at least for some physical bearers, particularly Bluetooth, is that the name of the start page is retrieved through service discovery.

Three use cases involving the mobile telephone 1 and the digital camera 50 will now be described. It is assumed that the digital camera 50 is capable of producing digital pictures and storing them locally in e.g. the flash memory 330. As described above, the digital camera 50 is connected through a serial cable 52 to the accessories interface 16 of the mobile telephone 1. Obviously, the camera could equally well have been connected via an infrared or Bluetooth interface. The digital camera 50 is provided with the WAP server 340 shown in FIG. 3.

The mobile telephone 1 is provided, as described above, with the WAP client 240 shown in FIG. 2. Initially, the user takes a few pictures using the digital camera 50. The user then connects his/her mobile telephone 1 to the digital camera 50 by means of the serial cable 52. A WML start page is then transmitted by the WAP server 340 to the WAP client 240 across the serial cable 52, and the start page is presented on the display 13. The start page contains a plurality of controls, representing different functions of the digital camera 50. The user may for instance choose to view the pictures captured in the digital camera 50. The pictures are then sent, one by one, from the WAP server 340 to the WAP client 240, which presents the pictures on the display 13.

The user may then select one of the pictures, that he/she wants to publish on the Internet 20. The user may specify a certain WAP or web server available on the Internet by filling in its HTTP (Hypertext Transfer Protocol) address in a WML form submitted from the WAP server 340. A dial-up GSM data connection 22 (FIG. 1) is established with an Internet service provider, and the WAP browser 240 of the mobile telephone 1 connects to the specified WAP or web server on the Internet. The selected picture is then sent over the link 22 for publication on the specified WAP or web server. Finally, the user disconnects the digital camera 50 from the mobile telephone 1, wherein the logical connection between the WAP browser 240 and the WAP server 340 will be interrupted too, as well as the dial-up connection 22 to the Internet.

In the second use case, the user connects his telephone to the digital camera, as described above. The start page from the digital camera is presented on the display of the telephone. The user then enters a maintenance menu provided by the digital camera. All available settings for the digital camera are presented on a WML page submitted by the WAP server 340. These settings may for instance include the following functionality: capture picture, delete picture, scroll through pictures, resolution setting, color setting, flash mode, date/time settings, etc. The user may then select any setting and change its value. The changed value will be pushed back from the WAP client 240 to the WAP server 340 according to the methods described above, wherein the WAP server 340 will recognize the changed value and make sure that the actual setting of the digital camera 50 is changed accordingly. When the user is finished, he/she will disconnect the mobile telephone 1 from the digital camera 50, as described above.

In a third use case it is assumed that the digital camera has a malfunction. The user notices this and connects the camera 50 to the mobile telephone 1, as described above. The WAP server 340 of the camera 50 executes a predetermined error diagnosis WML page 338, which in turns invokes a CGI routine of the CGI module 334. The CGI routine fetches an error code from the controller 310, and this error code is submitted together with a predetermined HTTP address by the WAP server 340 to the WAP client 240 of the mobile telephone 1. A dial-up GSM data connection 22 (FIG. 1) is established with an Internet service provider, as described above. The WAP browser 240 of the mobile telephone 1 connects to the predetermined HTTP address, which points at a help-desk web site provided by the manufacturer or supplier of the digital camera 50. The error code is then transferred to the help-desk web site, which will return a clear-text message, illustrative image, etc., which explains the nature of the error and how it is best dealt with by the user.

The present invention has been described above with reference to a preferred embodiment. However, other embodiments than the one described above are equally possible within the scope of the invention, as defined by the appended independent claims, which is readily realized by a man skilled in the art. Specifically, other physical bearers than cable, infrared and short-range radio link are possible within the scope of the invention. Also, the invention is applicable to other electronic utility devices than the ones exemplified above, including but not limited to video recorders, hifi stereos, air conditioners, refrigerators or microwave ovens.

Moreover, the WAP client of the mobile telephone may be substituted for another information access program for accessing a global information network, possibly different than Internet. Correspondingly, the WAP server of the external utility devices may be substituted for another kind of information provider server.

The invention claimed is:

1. An electronic utility device of a type which provides a functionality to a user, the device comprising:
   a programmable controller;
   a memory coupled to the controller;
   an external control interface for remotely controlling the functionality of the device; and
   an information provider program stored in the memory and executable by the controller to communicate with a mobile radiotelephone through the external control interface according to at least one protocol for accessing a global information network, and being adapted to supply over a wireless interface the mobile radiotelephone with digital information, which is stored in the memory and is related to the functionality of the electronic utility device;
   wherein the electronic utility device includes electronic circuitry configured to detect an error associated with the operation or capabilities of the electronic utility device, to store an associated error message as the digital information related to the functionality of the electronic utility device, and to send the error message to the mobile radiotelephone.

2. An electronic utility device as in claim 1, wherein in response to receiving the error message, the mobile radiotelephone obtains and sends to the electronic utility device error response information, and wherein the electronic circuitry is configured to receive the error response information which is useable by the electronic utility device or a user of the electronic utility device for resolving the detected error.

3. An electronic utility device as in claim 2, wherein the error message includes an address of a web site server associated with electronic utility device to be accessed by the mobile radiotelephone with a specific error code contained in the error message to obtain from the web site server the information useable by the electronic utility device or a user of the electronic utility device for resolving the detected error.

4. A method for operating an electronic utility device including a programmable controller, a memory coupled to the controller, and an external control interface for remotely controlling the functionality of the device, comprising:
   storing an information provider program in the memory;
   the controller executing the stored program to communicate over a wireless interface with a mobile radiotelephone through the external control interface according to at least one protocol for accessing a global information network;
   the controller executing the stored program to supply the mobile radiotelephone with digital information stored in the memory related to the functionality of the electronic utility device;
   detecting an error associated with the operation or capabilities of the electronic utility device;
   storing an associated error message as the digital information related to the functionality of the electronic utility device; and
   sending the error message to the mobile radiotelephone.

5. The method in claim 4, wherein in response to receiving the error message, the mobile radiotelephone obtains and sends to the electronic utility device error resolving information, the method further comprising receiving the error resolving information which is useable by the electronic utility device or a user of the electronic utility device for resolving the detected error.

6. The method in claim 5, wherein the error message includes an address of a web site server associated with electronic utility device to be accessed by the mobile radiotelephone with a specific error code contained in the error message to obtain from the web site server the error resolving information.

7. An electronic utility device comprising:
   an external control interface means for remotely controlling the functionality of the electronic utility device;
   means for storing an information provider program wherein the means for storing is configured store an associated error message as the digital information related to the functionality of the electronic utility device;
   means for executing the stored program to communicate over a wireless interface with a mobile radiotelephone through the external control interface according to at least one protocol for accessing a global information network; means for executing the stored program to supply the mobile radiotelephone with digital information stored in the means for storing related to the functionality of the electronic utility device, wherein the means for executing is configured to detect an error associated with the operation or capabilities of the electronic utility device, and to send the error message to the mobile radiotelephone.

8. An electronic utility device as in claim 7, wherein in response to receiving the error message, the mobile radiotelephone obtains and sends to the electronic utility device error resolving information, and wherein the means for executing is configured to receive the error resolving information which is useable by the electronic utility device or a user of the electronic utility device for resolving the detected error.

9. An electronic utility device as in claim 8, wherein the error message includes an address of a web site server associated with electronic utility device to be accessed by the mobile radiotelephone with a specific error code contained in the error message to obtain from the web site server the error resolving information.

* * * * *